Figure 1:
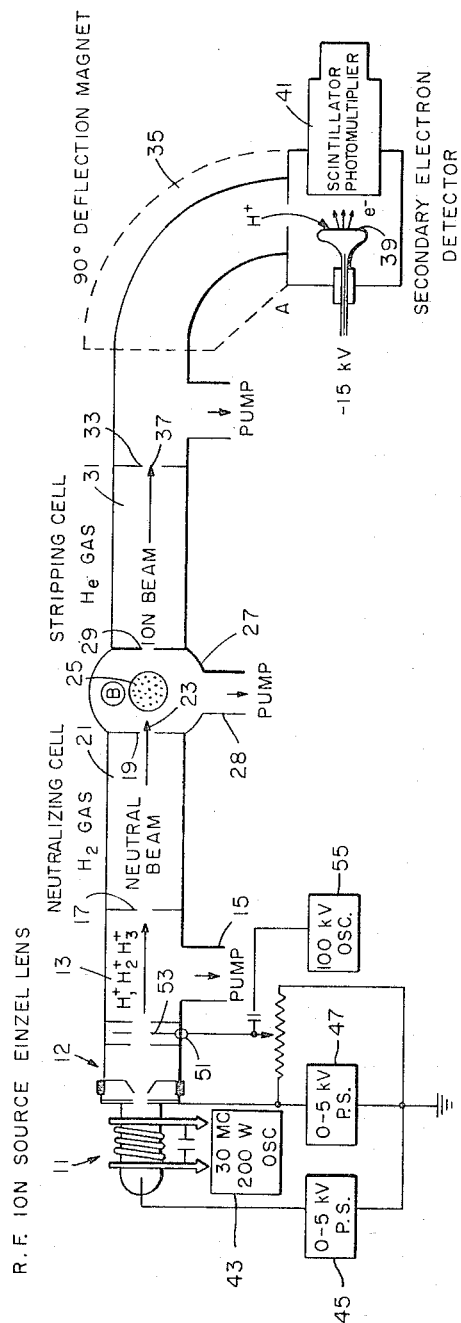

INVENTOR.
HAROLD P. EUBANK
BY

INVENTOR.
HAROLD P. EUBANK

United States Patent Office 3,300,640
Patented Jan. 24, 1967

3,300,640
MEANS FOR MEASURING PLASMA DENSITY BY RESONANT CHARGE TRANSFER WITH A BEAM OF NEUTRAL PARTICLES
Harold P. Eubank, Princeton, N.J., assignor to the United States of America as represented by the United States Atomic Energy Commission
Filed May 13, 1964, Ser. No. 367,264
8 Claims. (Cl. 250—43.5)

This invention relates to a method and apparatus for measuring plasma density and more particularly to means for measuring the densities of plasmas for thermonuclear research reactors.

In the field of physics it is often desirable to measure the density of a plasma. Various proposals have been made and used to accomplish such measurement, including the use of microwaves. While these microwaves have been useful and can accomplish the desired measurements, they have required the manufacture and assembly of complicated wave guide structures in which accuracy of dimensions and suitability for the exact frequencies of operation have been required. Additionally, it has often been difficult or impossible to make measurements of the high density plasmas that have been encountered in stellarators, plasma shock wave devices, MHD devices, etc. because the high densities have been above cut-off for the microwaves or too low for Stark broadening.

It is an object of this invention therefor, to provide an improved method and apparatus for density measurements for high density plasmas;

It is also an object of this invention to measure plasma densities in the range of $10^{13}$–$10^{15}$/cc.$^3$;

It is also an object of this invention to measure high plasma densities in stellarators, plasma shock wave devices, magneto hydrodynamic (MHD) devices or other devices with low plasma perturbation;

It is another object of this invention to provide for the measurement of plasma density with an atomic beam;

It is another object of this invention to provide a resonant charge transfer between plasma ions and an atomic beam of kilovolt energies;

It is another object of this invention to provide a particle beam for absolute plasma density measurements;

It is another object of this invention to provide a system of lenses for directing atomic beams and resonantly charges between atomic beams and a high density plasma;

It is still another object of this invention to produce a current from the interaction of an atomic beam and a plasma.

In accordance with this invention a method and apparatus is provided for the measurement of high plasma densities in the range of $10^{13}$–$10^{15}$ particles (ions) per cubic centimeter, such as are encountered in the B-1 stellarator at Princeton University as described and shown, e.g. on pages 59 and 318 in Controlled Thermonuclear Reactors by Samuel Glasstone and Ralph H. Lovberg, D. Van Nostrand Company, Inc., Princeton, New Jersey, 1960. The method and construction involved in this invention utilize standard and well known techniques and apparatus and are highly flexible for a wide range of plasma apparatus, applications, energies, temperatures, velocities and densities. Such well known apparatuses, comprise the stellarators described in U.S. Patents 3,171,788; 3,088,894; 3,016,341; 3,015,618; 3,012,955; 3,002,912; and 2,910,414. More specifically this invention involves the attenuation of a fast atomic input beam by resonant charge transfer with the plasma ions whereby the attenuation corresponds to the plasma density. With the proper selection and use of beam source, lens transport system for the input and output beams, and secondary electron detection means for the detection of the output beam plasma density can be determined easily, quickly, and efficiently with good spatial and temporal resolution.

The above and further novel features of this invention will appear more fully from the following detailed description when the same is read in connection with the accompanying drawings. It is to be expressly understood however, that the drawings are not intended as a definition of the invention but are for the purpose of illustration only.

Figure 2A:
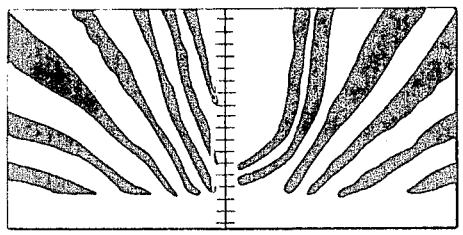
Figure 2B:
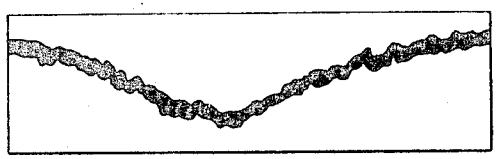
Figure 2C:
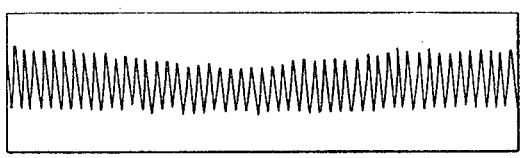
Figure 3A:
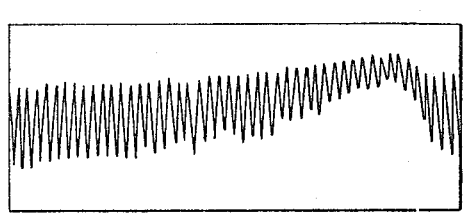
Figure 3B:
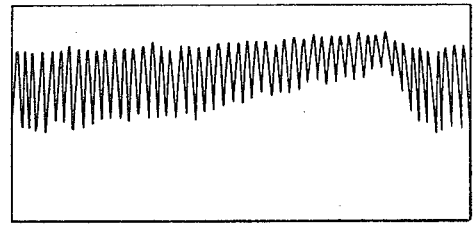
Figure 4:
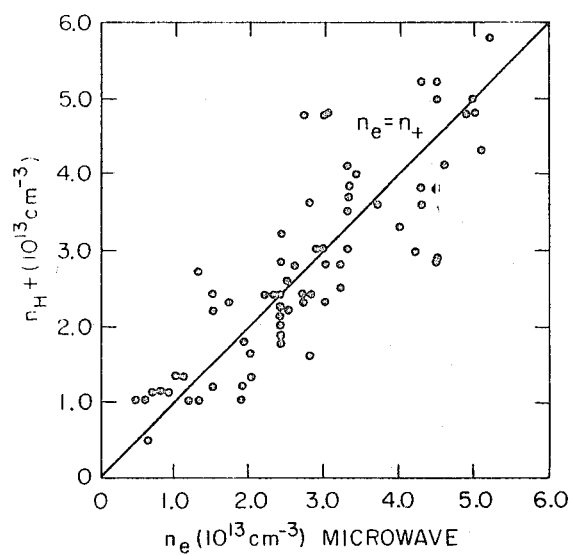

In the drawings where like parts are numbered alike:
FIG. 1 is a partial schematic drawing of the apparatus of this invention;
FIG. 2a is a graphic illustration of a density trace as recorded by a 4 mm. microwave interferometer showing amplitude vs. time corresponding to 50 $\mu$s./cm. to the right;
FIG. 2b is a graphic illustration of a density trace of the d.c. atomic beam of this invention showing amplitude vs. time corresponding to 50$\mu$s./cm. to the right;
FIG. 2c is a graphic illustration of a density trace of an atomic beam modulated at 100 kc. in accordance with this invention showing amplitude vs. time corresponding to 50 $\mu$s./cm. to the right;
FIG. 3 is a graphic illustration of a modulated atomic beam trace at a density of $1.5 \times 10^{14}$ particles per cm.$^3$, at a pressure of $3 \times 10^{-3}$ torr of $H_2$ showing amplitude vs. time corresponding to 50 $\mu$s./cm. to the right for a 2.5 kev. atomic beam energy;
FIG. 3b is a graphic illustration of a modulated atomic beam tract at a density of $2.1 \times 10^{14}$ particles per cm.$^3$, at a pressure of $5 \times 10^{-3}$ torr of $H_2$ torr of $H_2$ showing amplitude vs. time corresponding to 50 $\mu$s./cm. to the right for a 2.5 kev. atomic beam energy;
FIG. 4 is a graphic comparison of points between microwave ($n_e$) and atomic beam ($n_{H^+}$) systems with the straight line shown for $n_e = n_+$ for the best mean squares fit to data points having a line slope of 0.9 and intercept of $n + = 0.3 \times 10^{13}$ cm.$^3$.

It has been found in accordance with this invention, that a hydrogenic plasma attenuates an atomic beam of a few kev. A consideration of the pertinent particle cross-sections averaged over the appropriate velocity distributions has shown an attenuation of the atomic beam by resonant charge transfer of at least ten fold greater than that which has arisen from ionization by the electrons. Although the cross-section for elastic scattering of the fast atoms by the plasma ions is also large i.e., approximately the same as that for charge transfer, the scattered distributions have been so strongly forward that for the angular acceptance employed, the scattering has been negligible as a source of beam attenuation.

The apparatus, as illustrated in FIG. 1, comprises a radio-frequency excited ion source 11 having collimating lenses or apertures 12 formed by an Einzel lens, which introduce tens of microamperes of a mixture of $H^+$, $H_2^+$ and $H_3^+$ ions into zone 13, which is evacuated through conduit 15. These pass from zone 13 through aperture lens 17 and 19, which focus the ions and form a neutralizing cell 21 therebetween, having hydrogen therein at approximately 1 m. torr. A suitable conduit (not shown) introduces the hydrogen into cell 21 and maintains the proper pressure therein so as to produce a neutral particle beam 23.

The neutral plasma beam 23, which emerges from cell 21, substantially comprises neutral particles so as not to disturb the purity of the plasma 25. The mixed beam is focused into plasma vessel 27 by aperture lens 19 in the side of the vessel 27, the ions are removed from the beam by the perpendicular magnetic field ⓑ, which is circled to indicate a direction normal into the paper plane in FIG. 1, for the confinement of the plasma 25 and a fraction of the beam undergoes charge transfer. The plasma vessel is evacuated and/or plasma is introduced therein through conduit 28.

After passage through the plasma 25, whereby a fraction of the beam undergoes charge transfer, the remaining neutrals are focused by a aperture lens 29 in the side of vessel 27 opposite lens 19, and enter a stripping cell 31 having another aperture 33 in line with lenses 12 in the ion source 11 and lenses 17, 19 and 29 in the neutralizing cell 31 and plasma vessel 27. This stripping cell formed between lenses 29 and 33 has helium gas therein in which a small fraction of the neutrals are converted to $H^+$ ions. Helium has superior efficiency as a stripping agent, and to this end, a conduit (not shown) introduces the helium into this cell 31 and maintains this cell 31 under low pressure.

After the $H^+$ ions are formed in cell 31, they are focussed by aperture lens 33 and a 90° deflection magnet lens 35 which momentum analyzes these ions so that only the atomic portion of the beam is employed. This lens 35 bends this atomic beam 37 into negative lens 39 to produce secondary electrons which are focussed thereby into scintillator photomultiplier 41. Advantageously this secondary electron detector has an input current of $10^{-9}$ to $10^{-10}$ amperes and or detector amplification of about $10^6$.

In operation, a hydrogen ion source 11 having a main 30 mc., 200 w. oscillator source 43, an 0–5 kv. p.s. 45 at one end and an 0–5 kv. p.s. 47 for lenses 12 produces a pulsed D.C. beam 23 which is attenuated in plasma 25 to produce a corresponding A.C. output signal from photomultiplier 41. This mode of operation is well suited for small percentage attenuations and when maximum time response is desired.

When applied to the B–1 stellarator, where the impurity content is entirely negligible, a comparison can be made between a typical microwave interferometer output shown in FIG. 2a and the A.C. output from photomultiplier 41 shown in FIG. 2b for the same plasma density. The noise which appears most prominently in the latter display arises from the ion source itself and not from density fluctuations within the plasma. Although the microwave cut off is at a density of ~$6 \times 10^{13}$ particles per cm.$^3$, the atomic beam 23 of this invention is operable up to densities of $2.1 \times 10^{15}$ particles per cm.$^3$ or higher. In this regard, the attenuation of beam 23 at $2 \times 10^{14}$ cm.$^3$ density is ~60% and no difficulty is encountered in the measurement of densities to ~$10^{15}$ cm.$^3$ for which the attenuation is ~99%.

In one example, a 2.5–5 kev. atomic hydrogen beam was produced and was attenuated linearly with plasma density up to above $10^{14}$ particles per cm.$^3$. The stripped attenuated beam produced secondary electrons with an amplification of ~$10^6$. The time response was of the order of a Mc. for density fluctuations $\geq 10^{13}$/cc.

In another mode of operation, the input beam 23 is modulated at focus electrode lens 51 forming source apertures 53 by the application of a 100 kc. sine wave from modulating source 55 whereby the plasma attenuation produces an amplitude modulation of the 100 kc. carrier. This mode of operation offers the advantages that the D.C. level of the beam is not needed to determine the attenuation and a reasonably narrow band amplification can be employed whose pass band does not include much noise originating from the pulsed discharged.

The output from photomultplier 41 with this modulated atomic beam 23 is shown in FIG. 2c for the same plasma density illustrated in FIG. 2b, i.e. $4.5 \times 10^{13}$ cm$^3$. When the plasma 25 has a density of $1.5 \times 10^{14}$ cm.$^3$ and $2.0 \times 10^{14}$ cm.$^3$ respectively, which is above the cut-off for the microwave of FIG. 2a, the modulated beam 25 produces outputs from photomultiplier 41 illustrated in FIGS. 3a and 3b. At $2 \times 10^{14}$ cm.$^3$ density the attenuation of the modulated beam 23 is ~60% and at $10^{15}$ cm.$^3$ the attenuation of this beam is ~99%.

FIG. 4 shows the total comparison points between the electron density $n_e$ from the microwaves of FIG. 2a and the ion density $n_+$ from the atomic beam system of this invention. In computing the proton density from the beam attenuation typical charge transfer cross-section can be used. A best mean squares fit to the points gives a line of slope 0.9 and an intercept of $0.3 \times 10^{13}$ cm.$^3$.

It has been determined that there is no systematic difference between the microwave system and the atomic beam system which can be attributed to electron temperature. Additionally, a discharge in neon gas has shown the absence of large attenuations when resonant charge transfer does not occur.

The method and apparatus of this invention have the advantage of measuring high plasma densities up to over $6 \times 10^{13}$ ions per cm.$^3$ which is above microwave cut-off levels. Moreover, the method and apparatus of this invention are simple in construction and easy, quick and efficient in operation over a wide range of plasma applications, energies, temperatures, and velocities. Also, great sensitivity and accuracy are achieved with good spatial and temporal resolution in thermonuclear research apparatus such as stellarators and the like. Moreover, this invention provides useful interaction between an atomic beam and a plasma.

What is claimed is:

1. Apparatus for measuring a magnetically confined plasma ion density from $10^{13}$ to $10^{15}$ ions per cubic centimeter, comprising means consisting of a system of lenses for directing an atomic beam consisting of neutral particles across said plasma for resonantly transferring charges between the plasma ions and the atomic beam for attenuating the beam an amount corresponding with the density of said plasma, and means for detecting said attenuation by determining the amount of charge transfer to the neutral particles of the atomic beam by said resonant charge transfer during the traversal of said plasma by said atomic beam.

2. Apparatus for measuring a magnetically confined plasma ion density from $10^{13}$ to $10^{15}$ ions per cubic centimeter, comprising means consisting of a system of lenses for directing a pulsed atomic beam consisting of neutral particles across said plasma at right angles reasonantly to transfer charges between the plasma ions and the atomic beam an amount corresponding with the density of the beam for providing an alternating signal whose amplitude corresponds with said transfer between said beam and said plasma and means for detecting said alternating signal whereby said plasma density is measured.

3. Apparatus for measuring a magnetically confined plasma ion density from $10^{13}$ to $10^{15}$ ions per cubic centimeter, comprising means consisting of a system of lenses for resonantly transferring charges between a pulsed atomic beam consisting of neutral particles and said plasma, and means detecting said transfer for determining said plasma density.

4. The invention of claim 3 having means in which said beam is produced from a beam of neutralized $H_1^+$, $H_2^+$ and $H_3^+$ particles.

5. Apparatus for measuring a magnetically confined plasma in density from $10^{13}$ to $10^{15}$ ions per cubic centimeter, comprising means consisting of a system of lenses for resonantly transferring charges between said plasma and a pulsed, atomic beam comprising a neutralized beam of $H_1^+$, $H_2^+$ and $H_3^+$ particles and a detector for said transfer for determining said plasma density from said resultant beam after passing through said plasma, said detecting means having means for stripping the resultant beam for producing an ion beam, and means for converting and amplifying said ion beam in the form of an A.C. current.

6. Apparatus for measuring the ion density of a magnetically confined plasma having an ion density of from $10^{13}$ to $10^{15}$ first ions per cubic centimeter, comprising ion source means for producing a pulsed beam of $H_1^+$, $H_2^+$ and $H_3^+$ second ions, neutralizing cell means acting on said second ions to provide and direct an atomic beam consisting of neutral particles through said plasma, stripping cell means for charging the neutral particles passing through said plasma, magnetic means for deflecting the particles charged in said stripping cell means, means producing secondary electrons from the particles deflected by said magnetic means, and photomultiplier means for detecting said secondary electrons for determining the attenuation of the atomic beam particles directed across the plasma, the atomic beam resonantly transferring charges between said first ions of said plasma and said atomic beam particles thereby to attenuate the particles in said atomic beam an amount corresponding to the ion density of said plasma whereby said plasma density is determined with said photomultiplier means.

7. A method for determining the ion density of a magnetically confined plasma, comprising the steps of magnetically confining said plasma in a column, producing an atomic beam consisting of neutral particles, directing said atomic beam across said plasma column so as to capture in said plasma column an amount of said neutral particles that varies linearly with the ion density of said plasma in said column, and producing an electrical signal corresponding with the neutral particles captured from said beam of neutral particles by said plasma thereby to determine the density of said ions in said plasma column.

8. The invention of claim 7 in which said plasma column has a direction at right angles to the direction of said atomic beam whereby a fraction of said neutral particles are removed from the atomic beam by undergoing resonant charge transfer with said plasma.

References Cited by the Examiner
UNITED STATES PATENTS 3,230,366  1/1966  Mielczarek et al. _____ 250—49.5

FOREIGN PATENTS 931,825  7/1963  Great Britain.

OTHER REFERENCES

Nucleonics: "Gaging Gas Density with Fast Charged Particles"; Schumacher; McGraw-Hill, October, 1960, vol. 18, No. 10, pp. 106–114.

Review of Scientific Instruments; "Technique for Determining Density Distribution in Low Pressure, High Temperature Gases"; Ziegler et al., April, 1964, vol. 35, No. 4, pp. 450–456.

RALPH G. NILSON, *Primary Examiner.*

ARCHIE R. BORCHELT, *Examiner.*

A. L. BIRCH, *Assistant Examiner.*